(12) United States Patent
Naiel et al.

(10) Patent No.: US 12,110,031 B2
(45) Date of Patent: Oct. 8, 2024

(54) SYSTEMS AND METHODS FOR ESTIMATING LEVELNESS OF A TRAILER AND PROVIDING LEVELLING GUIDANCE

(71) Applicant: GM GLOBAL TECHNOLOGY OPERATIONS LLC, Detroit, MI (US)

(72) Inventors: Mohamed A. Naiel, Ajax (CA); Yun Qian Miao, Waterloo (CA); Cristinel Padurariu, Whitby (CA); Alaa M. Khamis, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 17/662,339

(22) Filed: May 6, 2022

(65) Prior Publication Data
US 2023/0356727 A1  Nov. 9, 2023

(51) Int. Cl.
*B60W 40/13* (2012.01)
*B60W 40/112* (2012.01)

(52) U.S. Cl.
CPC .......... *B60W 40/13* (2013.01); *B60W 40/112* (2013.01); *B60W 2300/14* (2013.01); *B60W 2420/403* (2013.01)

(58) Field of Classification Search
CPC ....... B60W 2300/14; B60W 2420/403; B60W 40/112; B60W 40/13; G01C 2009/066; G01C 9/06
See application file for complete search history.

(56) References Cited

U.S. PATENT DOCUMENTS

| | | | |
|---|---|---|---|
| 9,195,236 B1 * | 11/2015 | Fairfield | B60W 10/06 |
| 2023/0249673 A1 * | 8/2023 | Diessner | B60W 10/22 |
| | | | 701/38 |

* cited by examiner

*Primary Examiner* — Charles J Han
(74) *Attorney, Agent, or Firm* — Lorenz & Kopf LLP (57) ABSTRACT

Systems and methods for measuring how level a trailer is and providing trailer levelling guidance. The systems and methods include a vehicle comprising a vehicle levelness estimator, a trailer connectable to the vehicle and a rear facing camera mounted on the vehicle. The methods and systems include capturing an image of the trailer using the rear facing camera, receiving a vehicle levelness parameter from the vehicle levelness estimator of the vehicle, determining a rotation angle of the trailer relative to the vehicle based on the image, determining an estimated trailer levelness parameter based on the rotation angle and the vehicle levelness parameter, and outputting the estimated trailer levelness parameter.

20 Claims, 6 Drawing Sheets

SYSTEMS AND METHODS FOR ESTIMATING LEVELNESS OF A TRAILER AND PROVIDING LEVELLING GUIDANCE

The present disclosure generally relates to estimating levelness of a trailer and levelling of the trailer.

INTRODUCTION

Generally, certain vehicles, such as motor vehicles, may be used for towing different types of objects, which may be mounted on a trailer. For example, a motor vehicle may tow a boat, a recreation vehicle, a trailer filled with one or more objects, etc. Trailers, such as travel trailers or recreational camper trailers, are moved from location to location and some are utilized as living quarters at each new location. A topography of the ground surface at each location may not be perfectly flat and level, and it is desirable to bring the trailer into a horizontally level condition at each location, if possible, so that doors swing normally, sinks drain, horizontal surfaces in the trailer are not tilted out of level, appliances function correctly and in general living in the trailer is not adversely affected.

Accordingly, it is desirable to provide systems and methods for estimating how level a trailer is without necessarily requiring additional hardware to be installed in a towing vehicle or in the trailer. Furthermore, other desirable features and characteristics of the present invention will become apparent from the subsequent detailed description and the appended claims, taken in conjunction with the accompanying drawings and the foregoing technical field and background.

SUMMARY

In one aspect, a method is provided of measuring how level a trailer is. The trailer is connected to a vehicle. The method includes capturing an image of the trailer using a rear facing camera of the vehicle and receiving, via at least one processor, a vehicle levelness parameter from a vehicle levelness estimator of the vehicle. The vehicle levelness parameter indicates how level the vehicle is. The method includes determining, via the at least one processor, a rotation angle of the trailer relative to the vehicle based on the image and determining, via the at least one processor, an estimated trailer levelness parameter based on the rotation angle and the vehicle levelness parameter. The estimated trailer levelness parameter indicates how level the trailer is. The method includes outputting, via the at least one processor, the estimated trailer levelness parameter.

In embodiments, outputting the estimated trailer levelness parameter includes generating a user interface indicating the estimated trailer levelness parameter. The user interface may include on at least one of a native display device of the vehicle and a display device of a mobile computer.

In embodiments, outputting the estimated trailer levelness parameter includes integrating levelness information based on the levelness parameter into a digital elevation map.

In embodiments, outputting the estimated trailer levelness parameter includes providing the estimated trailer levelness parameter to an automatic trailer levelling system.

In embodiments, determining the rotation angle of the trailer relative to the vehicle based on the image includes aligning optical features of the image to those of a reference image.

In embodiments, the reference image is obtained by the camera during an initialization process when the trailer is known to be leveled and the reference image is stored in memory.

In embodiments, the method includes determining, via the at least one processor, a sensor based trailer levelness parameter based on levelness measurement from a trailer levelness estimator disposed on the trailer; determining, via the at least one processor, a fused trailer levelness parameter based on the vision based trailer levelness parameter and the sensor based trailer levelness parameter. In embodiments, determining the sensor based trailer levelness parameter includes regression from a model. In embodiments, determining the sensor based trailer levelness parameter includes determining a height of the trailer at each of opposed sides. In embodiments, determining the sensor based trailer levelness parameter includes converting the height of the trailer at each of opposed sides to a roll angle.

In embodiments, determining the fused trailer levelness parameter includes fusing, via the at least one processor, the sensor based trailer levelness parameter and the roll angle using a variance based weighting scheme or other fusion technique including at least one of Bayesian fusion or Dempster's rule of combination.

In embodiments, the trailer levelness estimator is included in a personal mobile computing device including an Inertial Measurement Unit (IMU). In embodiments, the vehicle levelness estimator includes a vehicle Inertial Measurement Unit (IMU).

In another aspect, a system is provided for measuring how level a trailer is. The system includes a vehicle comprising a vehicle levelness estimator, a trailer connectable to the vehicle, a rear facing camera mounted on the vehicle and at least one processor in operable communication with the rear facing camera. The at least one processor is configured to execute program instructions. The program instructions are configured to cause the at least one processor to: capture an image of the trailer using the rear facing camera and receive a vehicle levelness parameter from the vehicle levelness estimator of the vehicle. The vehicle levelness parameter indicates how level the vehicle is. The program instructions are configured to cause the at least one processor to determine a rotation angle of the trailer relative to the vehicle based on the image and determine an estimated trailer levelness parameter based on the rotation angle and the vehicle levelness parameter. The estimated trailer levelness parameter indicates how level the trailer is. The program instructions are further configured to cause the at least one processor to output the estimated trailer levelness parameter.

In embodiments, the program instructions are configured to cause the at least one processor to: determine a sensor based trailer levelness parameter based on a levelness measurement from a trailer levelness estimator disposed on the trailer and determine a fused trailer levelness parameter based on the roll angle and the sensor based trailer levelness parameter. In embodiments, determining the sensor based trailer levelness parameter includes regression from a model. In embodiments, determining the sensor based trailer levelness parameter includes determining a height of the trailer at each of opposed sides and converting the height of the trailer at each of opposed sides to a roll angle.

In embodiments, the trailer levelness estimator is included in a personal mobile computing device including an Inertial Measurement Unit (IMU).

In embodiments, the vehicle levelness estimator includes a vehicle Inertial Measurement Unit (IMU).

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

This present disclosure leverages an in-vehicle camera and one or more trailer IMU sensors (or other trailer levelness estimators) to generate a trailer leveling feature to help users to level their trailer properly. High-definition (HD) elevation data may be utilized to determine a level state for initializing/calibrating the system.

Systems and methods described herein may utilize high-definition elevation data or buffered in-vehicle level estimation to initialize a leveling algorithm. A vision-based algorithm is described that predicts an angle or height of unlevelling of a trailer with respect to a vehicle. A sensor-based (e.g. Inertial Measurement Unit (IMU)) technique is disclosed that estimates the angle or height of unlevelling of the trailer with respect to the ground level. A statistical-based trailer unlevelling angle or height prediction technique is formulated using information fusion to exploit complementary aspects of unimodal level estimates (sensor-based and vision-based) as a way to enhance overall accuracy and robustness. A location-based leveling score and user experience score for recommending the best nearby known camping site is provided through crowdsensing.

The trailer levelness estimate obtained by the systems and methods described herein can be used as an enabler for manual leveling guidance, such as providing information to a user to place leveling block(s) (made of wood, plastic or other proper material) of certain thickness and width under the wheels to level the trailer. Other manual levelling techniques are also possible. Further, the trailer levelness estimate can be used as an enabler for an automatic leveling mechanism. The trailer level estimate can be integrated into off-road high definition-3D (three dimensional) maps Systems and methods described herein may assist a user to level a trailer during parking by indicating the unlevelness of the trailer using only a single camera of a towing vehicle (e.g. a truck) and a low-cost in-vehicle image analysis algorithm, and without asking a user to install extra devices or sensors on/in the trailer. To offer a user the ability to receive a more precise unlevelness indication, the algorithm may fuse predictions generated from (a) in-vehicle vision and (b) a common levelness (e.g. IMU) sensor placed inside the trailer (such as a cellphone with IMU) or placed on the trailer outer surface (such as a drone with IMU) supported with a companion app and data communication to the vehicle. The systems and methods described herein save the user time during parking a Recreation Vehicle (RV) and the cost of extra equipment to level their RV trailer. The systems and methods allow users to receive recommendations about possible RV parking locations through reasoning from previous leveling maps and user experiences. As used herein, the terms "levelness" and "unlevelness" are used to describe whether the trailer is in a state of being level or not and is used in conjunction with a quantitative measure of an angle of the trailer relative to horizontal.

Figure 1:
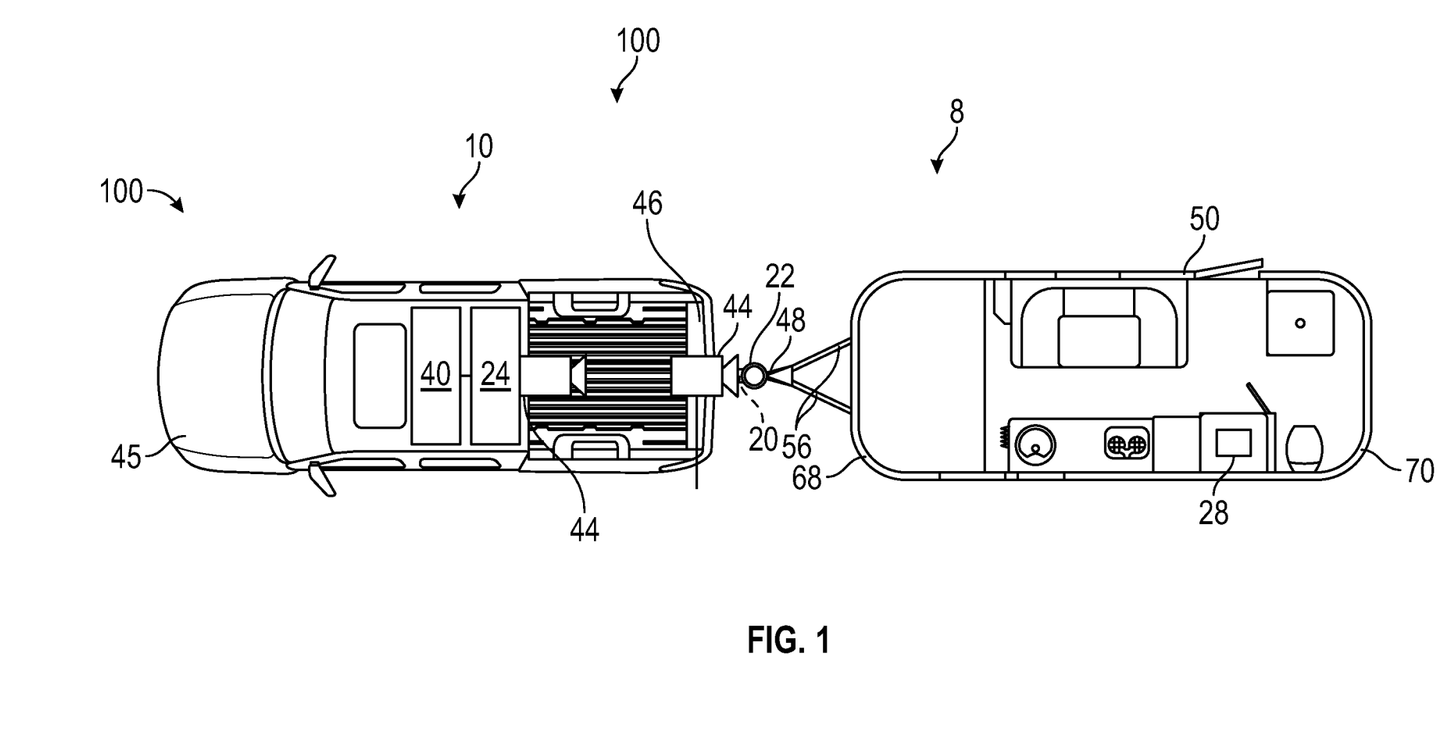
FIG. 1 is a schematic illustration of a towing vehicle coupled to and towing a trailer and including components of a trailer levelness estimation system, in accordance with various embodiments.

With reference to FIG. 1, a trailer levelness estimation system shown generally at 100 is associated with a towing vehicle 10 and a trailer 8 in accordance with various embodiments. In general, the trailer levelness estimation system 100 estimates a levelness of the trailer 8 at least using a vision-based technique whereby a rear facing camera captures an image of the trailer and processes that image to determine a relative rotation (roll) angle between the towing vehicle 10 and the trailer 8. In some embodiments, the vision-based levelness estimation is combined with a levelness-sensor based levelness estimate by which one or more mobile computing devices including a levelness sensor (e.g. an IMU) are placed on the trailer 8. The vision-based and sensor-based levelness estimations are fused to provide for enhanced robustness and accuracy in the levelness estimation result. A trailer levelness estimation parameter output may be used as an input to an automatic trailer levelling system, as an input to generate a graphical user interface indicating levelness state and as an input for integrating into a digital elevation map.

Figure 2:
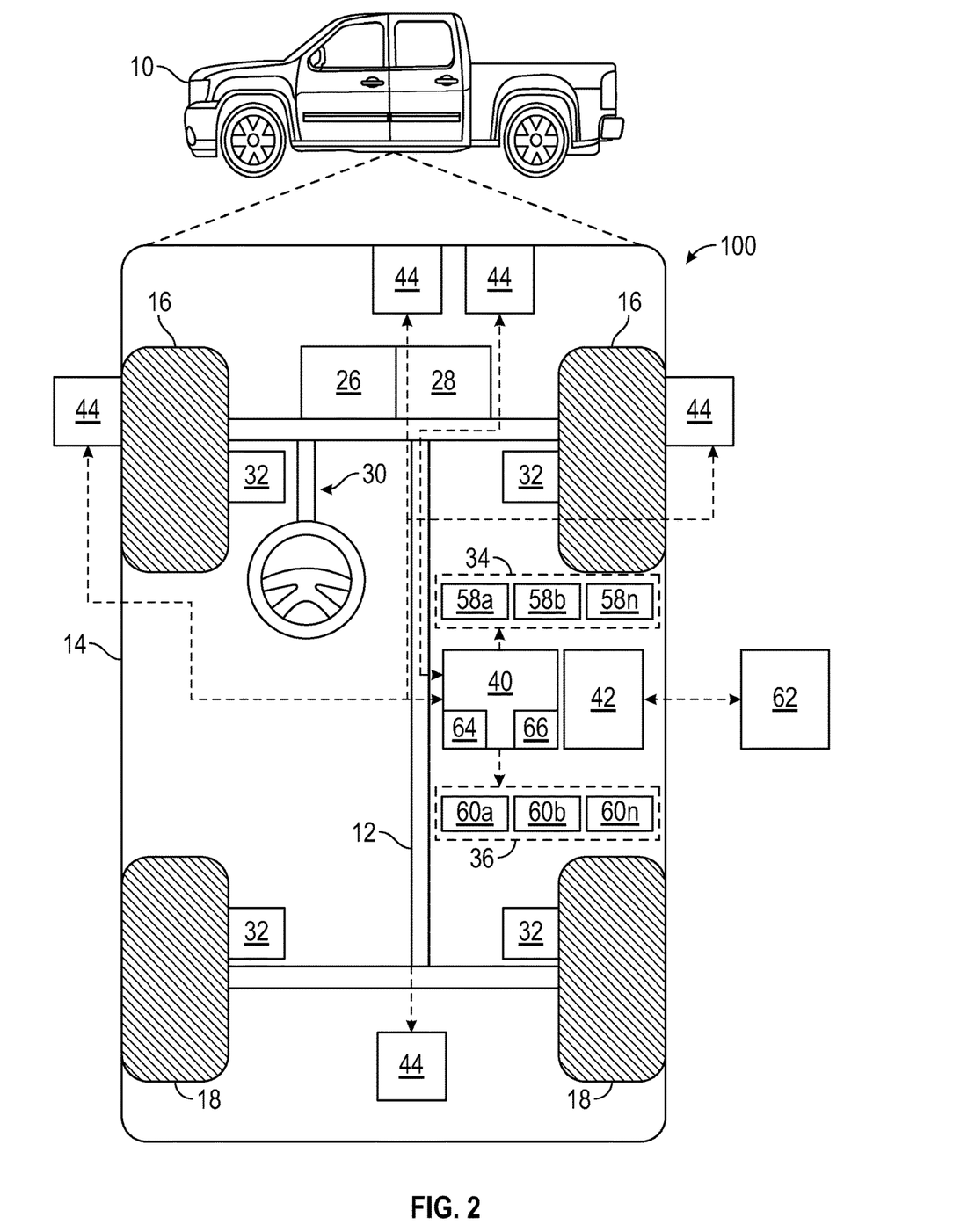
FIG. 2 is a functional block diagram illustrating the towing vehicle of FIG. 1 and including components of a trailer levelness estimation system, in accordance with various embodiments.

As depicted in FIGS. 1 and 2, the towing vehicle 10 is coupled to a trailer 8. The towing vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14.

In various embodiments, the trailer levelness estimation system 100 is incorporated at least partly into the towing vehicle 10 (hereinafter referred to as the vehicle 10). In other embodiments, the trailer levelness estimation system 100 includes computer program software that is implemented in a computer of the vehicle 10, in a personal mobile computing device, in a computer of the trailer 8, in a cloud computing service or a distribution therebetween. In certain embodiments, the vehicle 10 may be an autonomous vehicle that is capable of sensing its environment and navigating with little or no user input. The vehicle 10 is depicted in the illustrated embodiment as a truck, but it should be appreciated that any other vehicle including motorcycles, passenger cars, sport utility vehicles (SUVs), recreational vehicles (RVs), marine vessels, aircraft, etc., can also be used. Furthermore, the teachings herein are not limited to use only with automobiles but rather, may be used with other types of vehicles as well. For example, the teachings herein may be compatible with vehicles including, but not limited to, aircraft, railway cars, commercial vehicles including tractors, aircraft tugs, aircraft pushback tugs, forklifts, etc.

As shown, with reference to FIGS. 1 and 2, the vehicle 10 generally includes a hitch receiver 20, a hitch ball 22, a driver communication system 24, a propulsion system 26, a transmission system 28, a steering system 30, a brake system 32, a sensor system 34, an actuator system 36, at least one controller 40 and a communication system 42. As will be discussed, the towing vehicle 10 also includes one or more cameras 44. With reference to FIG. 1, the hitch receiver 20 is coupled to a rear 46 of the vehicle 10, and generally is coupled to a frame of the vehicle 10. The hitch receiver 20 defines a cavity or slot, which receives the hitch ball 22. The hitch ball 22 is generally locked into the hitch receiver 20 such that the hitch ball 22 is fixed within the slot. The hitch ball 22 receives a tongue 48 of the trailer 8. It should be noted that the hitch ball 22 need not comprise a ball, but rather, may comprise a pintle hook, gooseneck hitch, fifth wheel hitch, etc. The tongue 48 generally defines a concave receptacle that fits over the hitch ball 22. In certain instances, the tongue 48 of the trailer 8 is coupled to a body 50 of the trailer 8 via one or more drawbars 52.

The propulsion system 26 may, in various embodiments, include an internal combustion engine, an electric machine such as a traction motor, and/or a fuel cell propulsion system. The transmission system 28 is configured to transmit power from the propulsion system 26 to the vehicle wheels 16-18 according to selectable speed ratios. According to various embodiments, the transmission system 28 may include a step-ratio automatic transmission, a continuously-variable transmission, or other appropriate transmission. The brake system 32 is configured to provide braking torque to the vehicle wheels 16-18. The brake system 32 may, in various embodiments, include friction brakes, brake by wire, a regenerative braking system such as an electric machine, and/or other appropriate braking systems. The steering system 30 influences a position of the vehicle wheels 16-18. While depicted as including a steering wheel for illustrative purposes, in some embodiments contemplated within the scope of the present disclosure, the steering system 30 may not include a steering wheel.

The driver communication system 24 displays data for the driver and occupants of the vehicle 10, and also receives input from the driver and occupants of the vehicle 10. In one example, the driver communication system 24 comprises an infotainment system, and includes a display 54 and an input device 56. The display 54 is implemented as a flat panel display in an instrument panel or console of the vehicle 10. In this example, the display 54 is an electronic display capable of graphically displaying one or more user interfaces under the control of the controller 40. Those skilled in the art realize other techniques to implement the display 54 in the vehicle 10. The display 54 comprises any suitable technology for displaying information, including, but not limited to, a liquid crystal display (LCD), organic light emitting diode (OLED), plasma, or a cathode ray tube (CRT). As will be described, a graphical user interface depicting a levelness state of the trailer 8 as estimated by the trailer levelness estimation system 100 may be displayed on the display 54 in the vehicle 10.

The input device 56 receives inputs from the driver and/or occupant of the vehicle 10. The input device 56 may be implemented as a keyboard (not separately shown), a microphone associated with a speech recognition system (not separately shown), a touchscreen layer associated with the display 54, switches or levers, one or more buttons, a driver monitoring system (DMS) or other suitable device to receive data and/or commands from the user. Of course, multiple input devices can also be utilized. For example, at least one input device may be coupled to the hand wheel. The display 54 and the input device 56 are in communication with the controller 40 over a suitable communication architecture or arrangement that facilitates transfer of data, commands, power, etc.

The sensor system 34 includes one or more sensing devices 58a-58n that each sense observable conditions of the exterior environment and/or the interior environment of the vehicle 10. The sensing devices 58a-58n include, but are not limited to, radars, lidars, optical cameras, thermal cameras, ultrasonic sensors, and/or other sensors. In addition, one or more of the sensing devices 58a-58n may comprise at least a vehicle speed sensor. The one or more sensing devices 58a-58n are in communication with the controller 40 over a suitable communication architecture or arrangement that facilitates transfer of data, commands, power, etc. The vehicle speed sensor measures and observes a speed of the towing vehicle 10, and in one example, the vehicle speed sensor measures and observes a speed of an axle of the towing vehicle 10, and generates sensor signals based thereon. It should be noted that while the vehicle speed sensor is described herein as being associated with measuring and observing a speed of the axle, alternatively, the speed of the towing vehicle 10 can be inferred from a speed of the engine or determined by modeling, a computer vision method such as visual odometry, etc. The one or more sensing devices 58a-58n also include one or more steering angle sensors, which observe an angle of steering system component, such as an angle of the steering knuckles, the hand wheel angle, etc. that indicates whether the vehicle 10 is turning. Generally, the one or more steering angle sensors observe a movement of the steering system 30, which is processed by the controller 40 to determine a turning angle of the vehicle 10. The sensing devices 58a-58n may also include a range sensor, which observes a current range of the transmission system 28 and generates sensor signals based thereon, which are communicated to the controller 40. The one or more sensing devices 58a-58n include a vehicle levelness estimator 58a providing a measurement value of how level the vehicle 10 currently is. The vehicle levelness estimator 58a may be implemented by a native IMU of the vehicle 10 or by some other vehicle levelness estimator 58a such as the following types of digital inclinometers: liquid capacitive, electrolytic, gas bubble in liquid, and pendulum.

The actuator system 36 includes one or more actuator devices 60a-60n that control one or more vehicle features such as, but not limited to, the propulsion system 26, the transmission system 28, the steering system 30, and the brake system 32. In various embodiments, the vehicle features may further include interior and/or exterior vehicle features such as, but are not limited to, doors, a trunk, and cabin features such as air, music, lighting, etc. (not numbered in the figures).

The communication system 42 is configured to wirelessly communicate information to and from other entities 62, such as but not limited to, other vehicles ("V2V" communication), infrastructure ("V2I" communication), remote systems, one or more of the cameras 44a, 44b coupled to the trailer 8 and/or personal devices, such as one or more smart phones, tablets, etc. In an exemplary embodiment, the communication system 42 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 40 includes at least one processor 64 and a computer readable storage device or media 66. The processor 64 can be any custom made or commercially available processor, a central processing unit (CPU), a graphics processing unit (GPU), an auxiliary processor among several processors associated with the controller 40, a semiconductor based microprocessor (in the form of a microchip or chip set), a microprocessor, any combination thereof, or generally any device for executing instructions. The computer readable storage device or media 66 may include volatile and nonvolatile storage in read-only memory (ROM), random-access memory (RAM), and keep-alive memory (KAM), for example. KAM is a persistent or non-volatile memory that may be used to store various operating variables while the processor 64 is powered down. The computer-readable storage device or media 66 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling the vehicle 10.

The instructions may include one or more separate programs, each of which composes an ordered listing of executable instructions for implementing logical functions. The instructions, when executed by the processor 64, receive and process signals from the sensor system 34, perform logic, calculations, methods and/or algorithms for automatically controlling the components of the vehicle 10, and generate control signals to the actuator system 36 to automatically control the components of the vehicle 10 based on the logic, calculations, methods, and/or algorithms. Although only one controller 40 is shown in FIG. 1, embodiments of the vehicle 10 can include any number of controllers 40 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 40 are embodied in the trailer levelness estimation system 100 and, when executed by the processor 64, cause the processor 64 to receive and process signals from the one or more cameras 44a, 44b the vehicle levelness estimator 58a, a trailer levelness estimator (discussed further below) and estimate a levelness (or inclination or roll angle) of the trailer 8. The one or more instructions of the controller 40, when executed by the processor 64, may fuse a vision-based and sensor-based levelness estimation and may generate a display indicating a degree of offset of the trailer 8 from a horizontal or level condition.

According to various embodiments, the towing vehicle 10 includes one or more cameras 44a, 44b. In embodiments, one of the cameras 44b is coupled to the rear 46 of the vehicle 10. In this example, one of the cameras 44b is mounted to a tailgate of the vehicle 10; however, the cameras 44a, 44b may be mounted at any desired location along the rear 46 so as to face in a direction of the trailer 8. An additional or alternative camera 44a is mounted to a top of a cab of the towing vehicle 10 between a center high mounted stop lamp and roof of the cab and has a field of view encompassing a flat bed of the towing vehicle 10 (referred to as a Center High Mounted Stop Lamp (CHMSL) camera). The one or more cameras 44a, 44b face rearward and have a field of view encompassing at least part of a front face of the trailer 8 so that any captured image can be processed to determine a relative roll angle of the trailer 8 and the vehicle 10. Each of the cameras 44a, 44b on the vehicle 10 are in communication with the controller 40 wirelessly, via the communication system 42, or through a wired connection to a communication architecture that facilitates the transfer of data, power, commands, etc.

The cameras 44a, 44b each comprise any camera capable of capturing image data or an image data stream, as known to those skilled in the art. In certain embodiments, one or more of the cameras 44a, 44b may comprise a color camera capable of capturing color images. In other embodiments, one or more of the cameras 44a, 44b may comprise an infrared camera to capture infrared images. In certain embodiments, one or more of the cameras 44a, 44b may include a grayscale camera to capture grayscale images. In certain embodiments, one or more of the cameras 44a, 44b may comprise a stereo camera assembly capable of capturing stereo images with depth information. For example, one or more of the cameras 44a, 44b may include a stereo camera with two or more lenses and image sensors arranged to capture stereoscopic images about the vehicle 10 and/or trailer 8 with depth information. One or more of the cameras 44a, 44b may be long-range cameras for capturing images over an extended distance. Images may be captured by the cameras 44a, 44b according to various timings or other considerations. In certain embodiments, for example, the respective cameras 44a, 44b may capture images continuously as the vehicle 10 moves (based on the sensor signals from the one or more sensing devices 58a-58n) or based on a gear range of the transmission. In certain embodiments, the controller 40 may cause the respective cameras 44a, 44b to capture images of the areas near the rear 46 of the vehicle 10 and the rear 70 of the trailer 8, respectively, at regular time intervals as the vehicle 10 moves. For example, when the vehicle 10 is stopped or moving very slowly, and the controller 40 may process the images captured by the cameras 44a, 44b to estimate a levelness of the trailer 8. In other embodiments, the cameras 44a, 44b capture image upon request from a user through the input device 56 or through an application on a personal mobile computing device in order to commence trailer levelness estimation.

As will be discussed further below, the processor 64 receives and processes image data or an image stream from the one or more cameras 44a, 44b and compares optical features thereof with those of a reference image taken with the trailer 8 at a known angular rotation relative to the vehicle 10 and with the vehicle 10 at a known angle relative to horizontal. The known angle may be zero degrees. The comparison allows the processor 64 to derive a current angular rotation of the trailer 8 with respect to the vehicle 10.

Figure 3:
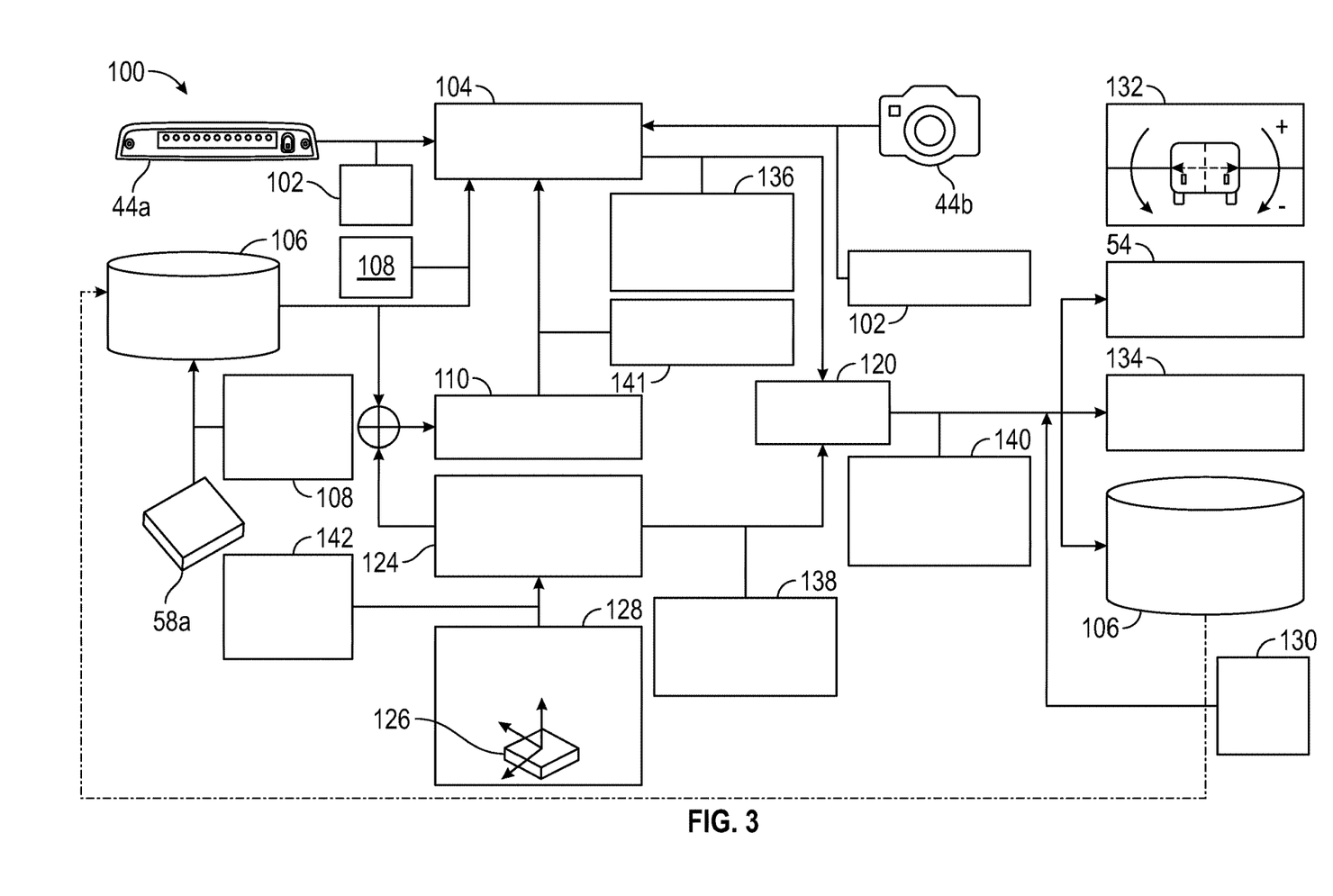
FIG. 3 is a functional block diagram illustrating a trailer levelness estimation system, in accordance with various embodiments.

For example, as shown in more detail with regard to FIG. 3, and with continued reference to FIGS. 1-2, a dataflow diagram illustrates various embodiments of the trailer levelness estimation system 100, which may be embedded within the controller 40. Various embodiments of the trailer levelness estimation system 100 according to the present disclosure can include any number of modules embedded within the controller 40. As can be appreciated, the modules shown in FIG. 3 can be combined and/or further partitioned to similarly generate an estimation of trailer levelness (or inclination relative to horizontal). In various embodiments, the trailer levelness estimation system 100 includes a digital elevation map 106, the one or more cameras 44a, 44b a vision-based level estimation module 104, the vehicle levelness estimator 58a, an initialization module 110, a levelness sensor-based level estimation module 124, a trailer levelness estimator 126, a personal mobile computing device 128, a fusion module 120, an output module 130, the display 54 and an automatic trailer levelling system 134.

Continuing to refer to the exemplary embodiment illustrated in FIG. 3, the one or more cameras 44a, 44b provide image data 102 to the vision based level estimation module 104. The image data 102 includes one or more digital images encompassing a front face of the trailer 8. The vision-based level estimation module 104 compares optical features of an image in the image data 102 to corresponding optical features of a reference image included in reference image data 141 to determine a relative angle of rotation therebetween. Since the reference image is captured at a known roll angle of the trailer 8, the relative angle of rotation of the trailer 8 and the vehicle 10 can be determined. The vision-based level estimation module 104 combines the relative rotation angle of the trailer 8 and the vehicle 10 with a measured vehicle levelness parameter 108 from the vehicle levelness estimator 58a. In other embodiments, the vehicle levelness parameter 108 can be derived from the digital elevation map 106 and a current location of the vehicle 10 (which is obtainable from a Global Positioning System of the sensor system 34 of the vehicle 10). The vision-based level estimation module 104 produces vision based trailer levelness parameter 136 indicative of a roll angle of the trailer 8 relative to horizontal. The vision based trailer levelness parameter 136 is a quantitative estimate of how level the trailer is based on the vision processing techniques described herein and may be expressed as a roll angle of the trailer 8 relative to the vehicle 10.

In some embodiments, a quality of the image data 102 is assessed by the vision-based level estimation module 104 to determine whether the image data 102 is of sufficient quality to allow an accurate levelness estimate using a vision technique. The vision-based level estimation module 104 may determine an image quality index (IQI) on the image data, which is an algorithm for estimating the level of degradation present in an image. If the IQI is lower than a threshold, then the trailer levelness estimation system 100 may revert to levelness sensor based techniques, which are discussed further below. When there is more than one camera providing image data, e.g. a CHMSL camera 44a and a rear view camera 44b, the IQI can be used to determine how much weight should be given to each vision based trailer levelness parameter 136 determined based on the images from respective cameras 44a, 44b. Lower IQIs result in less weight being given to the corresponding vision based trailer levelness parameter 136 when the vision based trailer levelness parameters 136 are combined in the fusion module 120.

In the exemplary embodiment of FIG. 3, the trailer levelness estimation system 100 includes the levelness sensor-based level estimation module 124. The levelness sensor-based level estimation module 124 receives a trailer levelness parameter 142 from a trailer levelness estimator 126. The trailer levelness estimator 126 can be any kind of digital inclinometer including IMU, liquid capacitive, electrolytic, gas bubble in liquid, and pendulum. In the illustrated embodiment, the trailer levelness estimator 126 is a multi-axis IMU that is included in a personal mobile computing device 128. The personal mobile computing device 128 can be a laptop, a tablet, a smartphone, etc. The trailer levelness parameter 142 can be included in other types of electronic devices having native IMUs such as an Unmanned Aerial Vehicle (UAV). In some embodiments, the personal mobile computing device 128 is removably disposed (e.g. placed) on a surface of the trailer 8 such that fixed installation is not required. The levelness sensor-based level estimation module 124 receives the trailer levelness parameter 142 and determines how level the trailer is based thereon. The levelness sensor-based level estimation module 124 may utilize a regression model or artificial intelligence to determine a sensor based trailer levelness parameter, which is indicative of how level the trailer is. The sensor based trailer levelness parameter 138 is a quantitative estimate of how level the trailer is using the trailer levelness parameter 142 provided by the trailer levelness estimator 126 and the regression model.

The fusion module 120 receives the vision based trailer levelness parameter 136 and the sensor based trailer levelness parameter 138 and determines a fused trailer levelness parameter 140 based thereon. Information fusion can be performed in a variety of ways. In one exemplary embodiment, the following equation is used:

(equation 1)
$$L_t^f = \text{median}\left(\left\{\frac{w_v}{w_v + w_i}l_{\bar{t}}^v + \frac{w_i}{w_v + w_i}l_{\bar{t}}^i \,\middle|\, \bar{t} = t, t-1, \ldots, t-N_s\right\}\right)$$

where:

$l_t^v$: estimated trailer level at time t using vision (i.e. using vision-based level estimation module 104) with variance $\sigma_v$;

$l_t^i$: estimated trailer level at time t using IMU (i.e. using levelness sensor-based level estimation module 124) with variance $\sigma_i$;

$w_v$ and $w_i$: are weights to aggregate the multiple estimates; weights are inversely proportional to the variance; as discussed previously, weights may also be inversely proportional to IQI for vision-based trailer levelness estimate; and $L_t^f$: estimated trailer level based on information fusion (i.e. fused trailer levelness parameter 140.

Whilst the fusion module 120 allows for enhanced accuracy in the estimated trailer levelness determination, a vision-based level estimation may be derived that is not fused with a levelness sensor-based estimation. Other fusion techniques to that in FIG. 1 are possible including as Bayesian fusion or Dempster's rule of combination that takes into consideration a degree of confidence of each modality The output module 130 receives the fused trailer levelness parameter 140 and orchestrates one or more outputs including generating a user interface 132, providing trailer levelness information to an automatic trailer levelling system 134 and integrating trailer levelness information into the digital elevation map 106. The user interface 132 may be a graphical user interface that is provided to the display 54 of the vehicle 10. In other embodiments, the user interface 132 is provided to a display of the personal mobile computing device 128. The user interface 132 depicts an interpretation of the fused trailer levelness parameter 140 so that the user can ascertain a levelness state of the trailer 8 (e.g. a roll angle) and can take corrective action. The corrective action can include placing material under one of the wheels or stand jacks of the trailer 8 to bring the trailer into a level (zero inclination relative to horizontal along a wheel axis) condition. The corrective action can additionally or alternatively include changing a height setting of a stand jack. The fused trailer levelness parameter 140 may be in the form of a roll angle (angle of inclination of a wheel axis of the trailer 8) and this may be converted to a height (or height difference) of each of opposed sides of the trailer 8 by trigonometry. Height may provide a more intuitive value for the user as the amount of adjustment needed to equalize the height may be more directly understood than a roll angle. The user interface 132 can depict the roll angle relative to horizontal or height differentiation between opposed sides of the trailer 8 using number values and/or graphically. In the example of FIG. 3, the user interface shows a lateral axis of the trailer 8 according to the fused trailer levelness parameter 140 and may additionally show a horizontal axis for reference.

The automatic trailer levelling system 134 may have motorized or hydraulic devices for adjusting a height of the trailer 8 at each of opposed sides of the trailer 8. Based on the fused trailer levelness parameter 140, the automatic trailer levelling system 134 receives which side of the trailer requires height adjustment and by how much in order to level the trailer 8 automatically.

Digital elevation maps 106 may include high density georeferenced elevation information for roadways but may not include such data for off-road locations or other common trailer parking areas. The output module 130 receives GPS data from the personal mobile computing device 128 and/or from the sensor system 34 of the vehicle 10 and integrates levelness information into the digital elevation map 106 along with the current location. The digital elevation map 106 may be cloud based so that the levelness information can be accessed by other users to ascertain flat areas suitable for parking a trailer 8.

Figure 4:
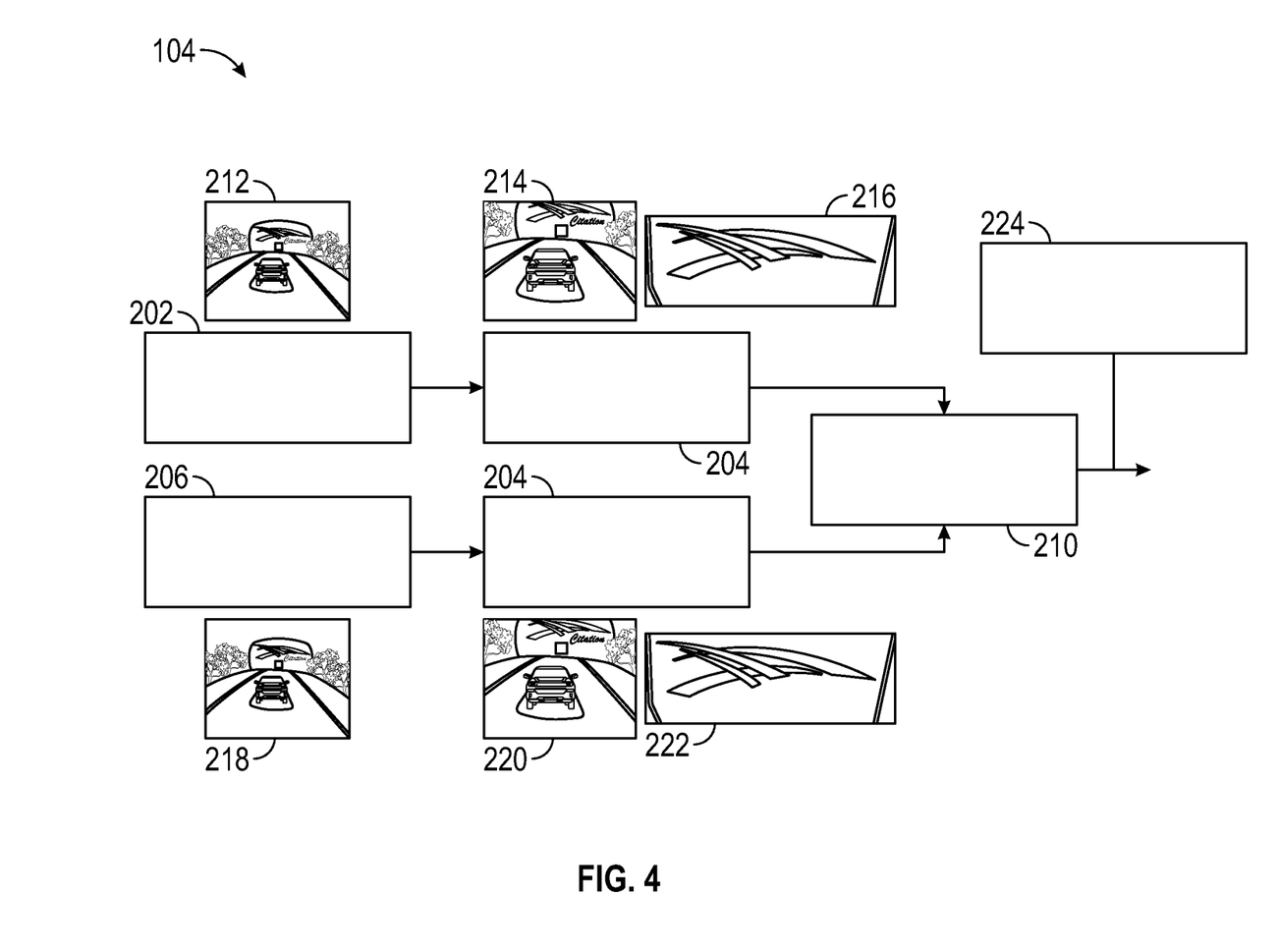
FIG. 4 is a dataflow diagram illustrating vision-based level estimation, in accordance with various embodiments.

FIG. 4 provides a data flow diagram illustrating steps performed in vision-based level estimation module 104, in accordance with exemplary embodiments. The vision-based level estimation module 104 receives a reference image frame 202 and a test image frame 206. The reference image frame 202 is retrieved from computer readable storage device or media 66 or other memory. The reference image frame 206 is included in reference image data 140 and is established as part of an initialization process carried out by the initialization module 110. The initialization process may be instigated upon request by a user through input device 56 or upon detection of a level condition. A level condition may be detected by referencing the digital elevation map 106 and a current location of the vehicle 10 and the trailer 8 or by referencing a current vehicle levelness parameter 108 from the vehicle levelness estimator 58a. Alternatively, a level condition of the trailer 8 may be confirmed by a user through the input device 56. In other embodiments, the reference image frame 202 may be stored as predetermined information during, for example, manufacturing. When the trailer is known to be level, the image data 102 received from the one or more cameras 44a, 44b can be saved in the computer readable storage device or media 66 as the reference image frame 202. The reference image frame 202 thus provides a benchmark when a roll angle between the trailer 8 and the vehicle 10 is zero degrees. However, provided the roll angle is known, the reference image frame 202 can be established at other roll angles than zero degrees.

The vision-based level estimation module 104 further receives a test image frame 206 as part of the image data 102. The test image frame 206 is an input image taken by the one or more cameras 44a, 44b when a roll angle of the trailer 8 relative to the vehicle 10 is not known. The vision-based level estimation module 104 may include an image processing sub-module 204 that performs image pre-processing steps including image rectification and region of interest (ROI) cropping. Image rectification of the reference image frame 202 and the test image frame 206 projects the received images onto a common plane. Referring to FIG. 4, the reference image frame 202 and the test image frame 218 include some fisheye distortion, which is rectified by the image processing sub-module 204 using, in one embodiment, spherical and digital distortion models to provide a rectified reference image 214 and a rectified test image 220. Further, a region of interest selection step may be performed by the image processing sub-module 204 whereby part of the rectified reference image 214 and the rectified test image 220 are selected and a surrounding region is cropped away to provide a cropped reference image 216 and a cropped test image 222. The region of interest selection may take a predetermined part of the input image or the selection may be made by identifying optical features of interest and drawing a region of interest relative thereto.

The vision-based level estimation module 104 includes a rotation angle estimation sub-module 210. The rotation angle estimation sub-module 210 compares the cropped reference image 216 and the cropped test image 222 and aligns optical features in order to estimate an amount of relative rotation required to align the optical features of the cropped test image 222 and the cropped reference image 216. This relative rotation reveals a rotation angle indicating a roll angle between the trailer 8 and the vehicle 10. The vision-based level estimation module 104 can combine the rotation angle 224 with the vehicle levelness parameter 108 to determine the vision based trailer levelness parameter 136. The vision based trailer levelness parameter 136 may be expressed as a roll angle in degrees or, by trigonometric conversion, as a relative height of opposed sides of the trailer 8.

Figure 5:
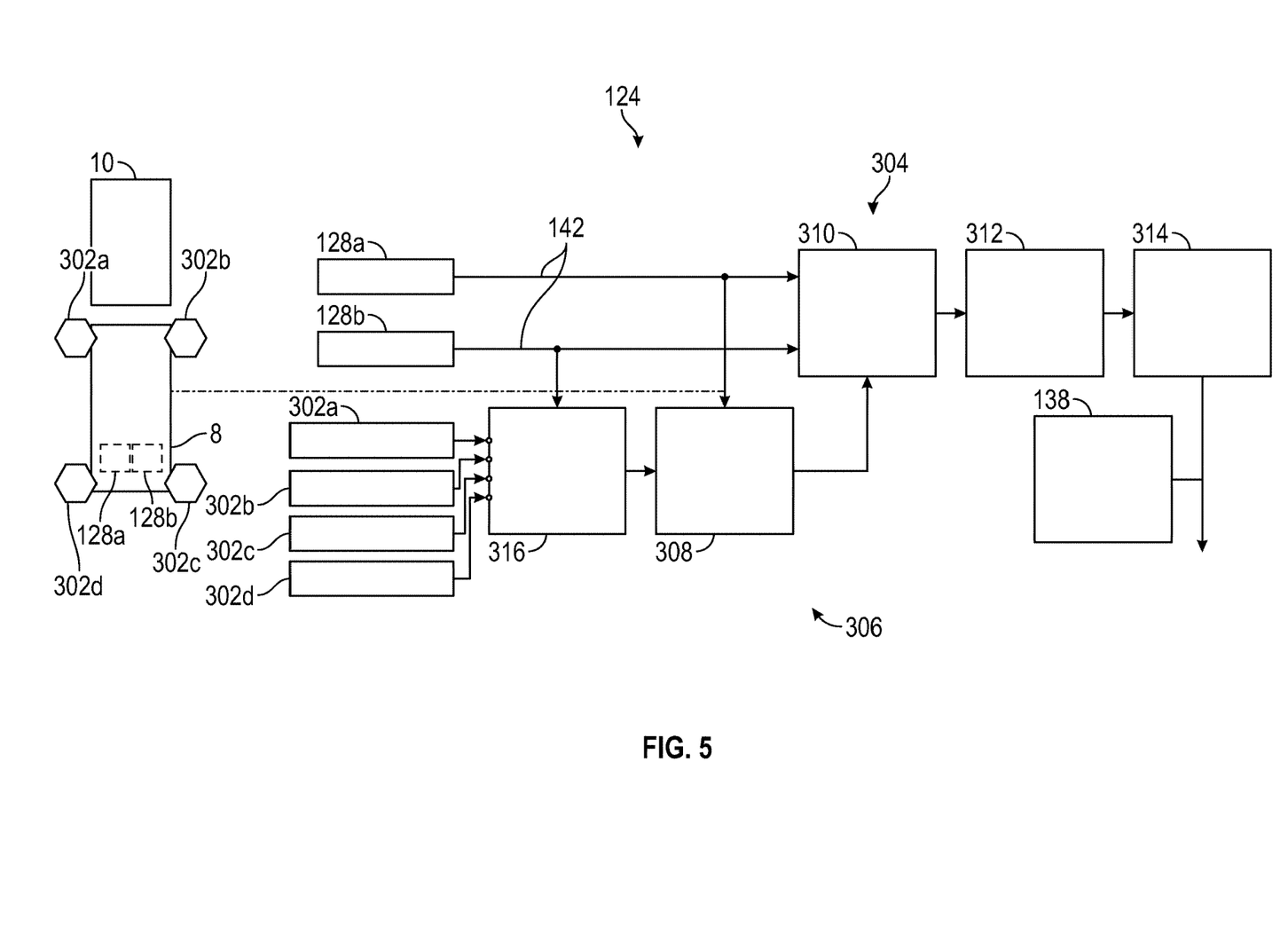
FIG. 5 is a dataflow diagram illustrating sensor-based level estimation, in accordance with various embodiments.

FIG. 5 illustrates a data flow diagram illustrating algorithmic steps performed in the levelness sensor-based level estimation module 124, in accordance with an exemplary embodiment. The levelness sensor-based level estimation module 124 is shown to have a training phase 306 and a testing phase 304. During a training phase 306, the trailer 8 has height measurement devices 302a, 302b, 302c, 302d mounted to at least two opposed corners and optionally four corners of the trailer 8. In one embodiment, the height measurement devices 302a-d include a laser height measurement device, which may provide a digital output or which may include a display that is recorded by a camera. Other digital height meters may be used such as one based on ultrasonic technology. The height measurement devices 302a-d measure a height of the trailer 8 relative to ground, thereby providing an indication of roll angle of the trailer 8 relative to the truck 10. During the training phase 306, one or more personal mobile computing devices 128a, 128b each include a trailer levelness estimator 126 and provide a signal representing the trailer levelness parameter 142. The signal output from the trailer levelness estimator(s) 126 may be magnetic field measurements in the case of an IU. The training phase 306 may include an optical character recognition (OCR) sub-module 316 for converting a height measurement on a display of the height measurement devices 302a-d that are recorded by camera. The OCR provides digital height values for further processing. The training phase 306 includes a signal alignment and labelling sub-module 308, which time aligns (using signal timestamps) and associates the trailer levelness parameter(s) 142 with height measurements from the height measurement devices 302a-d. The association of time aligned trailer levelness parameter(s) with the height (or height difference) measurements is, in essence, an automated labelling of the trailer levelness parameter(s) with height measurements (or relative height measurements).

The training phase 306 further includes a features extraction sub-module, which extracts relevant features from the signal representing the trailer levelness parameter 142. A regression model 312 is created and refined during the training phase 306, which embodies a relationship between height (or relative height or roll angle) of the trailer 8 at opposed sides of the trailer at two or four corners. Once the regression model 312 has been built, it can subsequently be used during a testing phase 304 by which the trailer levelness parameter(s) 142 is input from the personal mobile computing device(s) 128a, 128b, features are extracted by the features extraction sub-module 310 and the regression model 312 is used to convert the trailer levelness parameter(s) to estimated heights of each of opposed sides of the trailer 8 relative to ground. Alternatively, the regression model 312 may produce a roll angle or relative height measurements. The testing phase 304 may further include a conversion sub-module 314 to convert from estimated height output from the regression model 312 to a roll angle to allow like parameters to be fused by the fusion module 120. The roll angle is output from the levelness sensor-based level estimation module 124 as the sensor based trailer levelness parameter 138.

Continuing to refer to FIG. 5, in one embodiment, in the training phase 306, a digital height meter reading from the height measurement devices 302a-d is used from one or multiple interest locations at each side of the trailer 8. A weighted average of height readings from the same side is used to summarize one meter reading for left and right sides of the trailer 8 at a given time stamp. IMU signals generated from one or more sensors (e.g. included in the personal mobile computing devices 128a, 128b) placed inside or on the trailer 8, are aligned with the incoming meter readings using the time stamps. A median filter may be used to smooth the IMU signal within a time of interest. A regression model 312 is constructed using common support vector machine with radial basis kernel, or other non-linear regression fit can be used as quadratic regression fit. In the testing phase 304, the IMU signal (trailer levelness parameter 142) is used to predict the trailer height for each side, and this height can be converted into rotation angle using a trigonometric calculation by the conversion sub-module 314.

Figure 6:
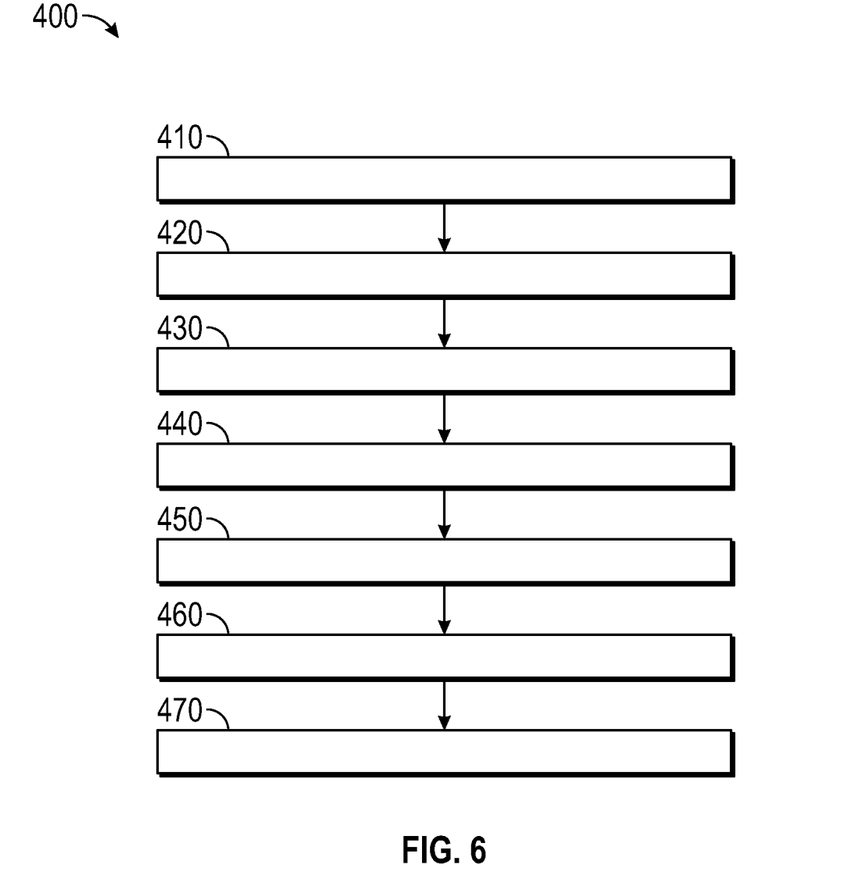
FIG. 6 is a flowchart illustrating method steps for estimating levelness of trailer, in accordance with various embodiments.

Referring now to FIG. 6, and with continued reference to FIGS. 1-5, a flowchart illustrates a method 400 of estimating levelness of the trailer 8 that can be performed by the trailer levelness estimation system 100 of FIGS. 1-5 in accordance with the present disclosure. In various embodiments, the method 400 is performed by the processor 64 of the controller 40. In other embodiments, the method 400 is performed by a processor of the personal mobile computing device 128. As can be appreciated in light of the disclosure, the order of operation within the method 400 is not limited to the sequential execution as illustrated in FIG. 6, but may be performed in one or more varying orders as applicable and in accordance with the present disclosure. In various embodiments, the method 400 can be scheduled to run based on one or more predetermined events such as detection of a parking state of the trailer 8 (e.g. by determining that the vehicle 10 is stationary for a predetermined minimum amount of time), and/or can run in response to a user request via the input device 56.

In step 410, the vehicle levelness parameter 108 is received from the vehicle 10. The vehicle levelness parameter 108 may correspond to an IMU reading obtained from the vehicle levelness estimator 85a via a Controller Area Network (CAN) of the vehicle 10. The vehicle levelness parameter 108 indicates an angle of inclination of the vehicle 10 relative to horizontal.

In step 420, an image of a front face of the trailer 8 is captured by the one or more cameras 44. The captured image is a test image frame 218 as shown in FIG. 4. The image may include readily recognizable optical features such as writing or other graphics that are included in the front face of the trailer 8. In step 430, vision-based level estimation is performed. Step 430 may be contingent on an IQI measurement of the test image frame 218 surpassing a predetermined threshold. Where there are more than one cameras 44a, 44b providing respective test image frames, the IQI measurement may be used to determine a weight to be used when combining vision based trailer levelness parameters 136 determined based on the respective test image frames. In step 430, the test image frame 218 is rectified and a ROI is cropped to provide a cropped test image 222. The cropped test image 222 is compared to a cropped reference image 216, which has been taken at a known rotation angle of the vehicle 10 relative to horizontal and relative to the trailer 8, to determine how much relative rotation is required in order to align optical features of the cropped test image 222 and the cropped reference image 216. The step of estimating a required rotation angle may include detecting features in the cropped reference image 216 and in the cropped test image 222, extracting feature descriptors, determining locations of corresponding points for each image, matching the points and estimating a transformation to transform between the matching point pairs. An exemplary algorithm for optical feature matching to determine the rotation angle is scale-invariant feature transform (SIFT). Since the angle relative to horizontal of the vehicle 10 is known from the vehicle levelness parameter 108 and the relative roll angle between the vehicle 10 and the trailer 8 has been estimated in step 430, the roll angle relative to horizontal can be estimated. Using trigonometry, this angle may be converted to an absolute height relative to the ground for both sides of the trailer 8 or to a relative height differential for opposed sides of the trailer 8.

In step 440, the trailer levelness parameter 142 is received. The trailer levelness parameter 142 may be received from a trailer levelness estimator 126 (e.g. an IIU) disposed on or in the trailer 8. In one embodiment, a personal mobile computing device 128, such as a mobile telephone, is placed on a surface of the trailer 8 that is intended to be horizontally oriented (e.g. a tabletop). In step 450, sensor-based level estimation is performed, which converts the trailer levelness parameter into a roll angle of the trailer 8 or a height measurement for opposed lateral sides of the trailer 8. In exemplary embodiments, the sensor-based levelness estimation utilizes the regression model 312 that has been trained to define a relationship between features extracted from the trailer levelness parameter 142 and heights of opposed sides of the trailer 8 from the ground or a roll angle of the trailer 8.

In step 460, the sensor based trailer levelness parameter 138 from step 450 and the vision based trailer levelness parameter 136 are fused. The fusion of these levelness parameters may be weighted based on an inverse of variance (or confidence score) that is tracked over time during use or that is tracked during testing of the trailer levelness estimation system 100.

In step 470, an output is generated based on the fused trailer levelness parameter 140 from step 460. The output can include a user interface 132 on the display 54 of the vehicle 10 or a display of the personal mobile computing device 128. The user interface 132 can provide a graphical depiction of roll angle or height adjustments that would be required to make the trailer 8 level relative to horizontal. The output can additionally, or alternatively, include integration of the levelness measurement into the digital elevation map 106 along with a location at which the levelness measurement was taken. The output can additionally, or alternatively, include providing the fused trailer levelness parameter 140 to the automatic trailer levelling system 134 for automatic adjustment of relative height of opposed sides of the trailer 8. This levelling process may repeat in a loop until the automatic trailer leveling system 134 has achieved a level condition according to the fused trailer levelness parameter 140.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of measuring how level a trailer is, wherein the trailer is connected to a vehicle, the method comprising:
    capturing an image of the trailer using a rear facing camera of the vehicle, the image encompassing a front face of the trailer;
    receiving, via at least one processor, a vehicle levelness parameter from a vehicle levelness estimator of the vehicle, the vehicle levelness parameter indicating how level the vehicle is, based on a digital elevation map and a current location of the vehicle;
    determining, via the at least one processor, a rotation angle of the trailer relative to the vehicle based on the image and a comparison of the image with a stored reference image that was captured at a known roll angle of the trailer;
    determining, via the at least one processor, a vision-based estimated trailer levelness parameter based on the rotation angle and the vehicle levelness parameter, the vision-based estimated trailer levelness parameter indicating how level the trailer is using the image from the rear facing camera of the vehicle, the vehicle level parameter from the digital elevation map and the current location of the vehicle, and the stored reference image;
    receiving, via the at least one processor, a sensor-based trailer levelness parameter based on a levelness measurement from a trailer levelness estimator disposed on the trailer, wherein the levelness estimator comprises an inertial measurement unit (IMU) that is disposed on a surface of the trailer;
    determining, via the at least one processor, a fused trailer levelness parameter based on a fusion of both (A) the vision-based estimated trailer levelness parameter with (B) the sensor-based trailer levelness parameter, utilizing different estimates at different respective times of both the vision-based estimated trailer levelness parameter and the sensor-based trailer levelness parameter, wherein the fusion of the estimated trailer levelness parameter with the sensor based trailer levelness parameter is weighted based on an inverse of variance that is tracked over time;
    outputting, via the at least one processor, the estimated trailer levelness parameter; and
    automatically adjusting a height under one or more wheels of the trailer, in accordance with instructions provided by the at least one processor.

2. The method of claim 1, wherein outputting the estimated trailer levelness parameter includes generating a user interface indicating the estimated trailer levelness parameter.

3. The method of claim 2, wherein the user interface is included on at least one of a native display device of the vehicle and a display device of a mobile computer.

4. The method of claim 1, wherein outputting the estimated trailer levelness parameter includes providing the estimated trailer levelness parameter to an automatic trailer levelling system.

5. The method of claim 1, wherein determining the sensor-based trailer levelness parameter includes regression from a model.

6. The method of claim 1, wherein determining the sensor-based trailer levelness parameter includes determining a height difference of the trailer at each of opposed sides.

7. The method claim 6, wherein determining the sensor-based trailer levelness parameter includes converting the height of the trailer at each of opposed sides to the roll angle.

8. The method of claim 1, wherein the levelness estimator comprises a multi-axis inertial measurement unit (IMU) that is included in a personal mobile computing device that is removably placed on a surface of the trailer.

9. The method of claim 1, further comprising:
automatically placing a jack under one or more wheels of the trailer, in accordance with instructions provided by the at least one processor, based on the fused trailer levelness parameter.

10. The method of claim 1, further comprising:
automatically adjusting a height setting of a jack under the one or more wheels of the trailer, in accordance with instructions provided by the at least one processor, based on the fused trailer levelness parameter.

11. The method of claim 1, wherein the fusing is performed via the at least one processor in accordance with the following equation:

$$L_t^f = \text{median}\left(\left\{\frac{w_v}{w_v + w_i}l_{\bar{t}}^v + \frac{w_i}{w_v + w_i}l_{\bar{t}}^i \,\middle|\, \bar{t} = t, t-1, \ldots, t - N_s\right\}\right),$$

and where:
$l_t^v$ represents an estimated trailer level at time t using the vision-based estimated trailer levelness parameter with variance $\sigma_v$;
$l_t^i$ represents an estimated trailer level at time t using the sensor-based estimated trailer levelness parameter with variance $\sigma_i$; and
$w_v$ and $w_i$: are respective weights to aggregate the multiple estimates.

12. The method of claim 11, wherein the weights $w_v$ and $w_i$ are inversely proportional to their respective variances.

13. The method of claim 11, wherein the weight $w_v$ is inversely proportional to an image quality indicator (IQI) for the vision-based trailer levelness parameter.

14. The method of claim 11, wherein:
the weights $w_v$ and $w_i$ are inversely related to their respective variances; and
the weight $w_v$ is also inversely related to an IQI for the vision-based trailer levelness parameter.

15. A system for measuring how level a trailer is, the system comprising:
a vehicle comprising a vehicle levelness estimator;
a trailer connectable to the vehicle;
a rear facing camera mounted on the vehicle;
at least one processor in operable communication with the rear facing camera, wherein the at least one processor is configured to execute program instructions, wherein the program instructions are configured to cause the at least one processor to:
capture an image of the trailer using the rear facing camera, the image encompassing a front face of the trailer;
receive a vehicle levelness parameter from the vehicle levelness estimator of the vehicle, the vehicle levelness parameter indicating how level the vehicle is, based on a digital elevation map and a current location of the vehicle;
determine a rotation angle of the trailer relative to the vehicle based on the image and a comparison of the image with a stored reference image that was captured at a known roll angle of the trailer;
determine a vision-based estimated trailer levelness parameter based on the rotation angle and the vehicle levelness parameter, the vision-based estimated trailer levelness parameter indicating how level the trailer is using the image from the rear facing camera of the vehicle, the vehicle level parameter from the digital elevation map and the current location of the vehicle, and the stored reference image;
receive a sensor-based trailer levelness parameter based on a levelness measurement from a trailer levelness estimator disposed on the trailer, wherein the levelness estimator comprises an inertial measurement unit (IMU) that is disposed on a surface of the trailer;
determine a fused trailer levelness parameter based on a fusion of both (A) the vision-based estimated trailer levelness parameter with (B) the sensor-based trailer levelness parameter, utilizing different estimates at different respective times of both the vision-based estimated trailer levelness parameter and the sensor-based trailer levelness parameter, wherein the fusion of the estimated trailer levelness parameter with the sensor based trailer levelness parameter is weighted based on an inverse of variance that is tracked over time;
output the estimated trailer levelness parameter; and
automatically adjusting a height under one or more wheels of the trailer, in accordance with instructions provided by the at least one processor.

16. The system of claim 15, wherein the levelness estimator comprises a multi-axis inertial measurement unit (IMU) that is included in a personal mobile computing device that is removably placed on a surface of the trailer.

17. The system of claim 15, wherein the fusing is performed via the at least one processor in accordance with the following equation:

$$L_t^f = \text{median}\left(\left\{\frac{w_v}{w_v + w_i}l_{\bar{t}}^v + \frac{w_i}{w_v + w_i}l_{\bar{t}}^i \,\middle|\, \bar{t} = t, t-1, \ldots, t - N_s\right\}\right),$$

and wherein:
$l_t^v$ represents an estimated trailer level at time t using the vision-based estimated trailer levelness parameter with variance $\sigma_v$;
$l_t^i$: represents an estimated trailer level at time t using the sensor-based estimated trailer levelness parameter with variance $\sigma_i$; and
$w_v$ and $w_i$: are respective weights to aggregate the multiple estimates.

18. The system of claim 17, wherein the weights $w_v$ and $w_i$ are inversely proportional to their respective variances.

19. The system of claim 17, wherein the weight $w_v$ is inversely proportional to an image quality indicator (IQI) for the vision-based trailer levelness parameter.

20. The system of claim 17, wherein:
the weights $w_v$ and $w_i$ are inversely related to their respective variances; and
the weight $w_v$ is also inversely related to an IQI for the vision-based trailer levelness parameter.

* * * * *